United States Patent
Newell et al.

(10) Patent No.: US 10,242,405 B2
(45) Date of Patent: *Mar. 26, 2019

(54) TRADE ENGINE PROCESSING OF MASS QUOTE MESSAGES AND RESULTING PRODUCTION OF MARKET DATA

(71) Applicant: Chicago Mercantile Exchange Inc., Chicago, IL (US)

(72) Inventors: Ron Newell, Chicago, IL (US); Vijay Menon, Chicago, IL (US); Fred Malabre, Chicago, IL (US); Joe Lobraco, Hoffman Estates, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/094,994

(22) Filed: Dec. 3, 2013

(65) Prior Publication Data

US 2014/0089164 A1   Mar. 27, 2014

Related U.S. Application Data

(63) Continuation of application No. 13/168,595, filed on Jun. 24, 2011, now Pat. No. 8,626,625, which is a
(Continued)

(51) Int. Cl.
*G06Q 40/04*   (2012.01)
*G06Q 20/10*   (2012.01)
(Continued)

(52) U.S. Cl.
CPC ............ *G06Q 40/04* (2013.01); *G06Q 20/10* (2013.01); *G06Q 30/0601* (2013.01);
(Continued)

(58) Field of Classification Search
CPC .......... H04N 21/235; H04N 21/64769; H04N 13/0066; H04W 48/06; G06F 13/00;
(Continued)

(56) References Cited

U.S. PATENT DOCUMENTS 4,093,823 A * 6/1978 Chu .............................. 370/535
5,297,032 A   3/1994 Trojan et al.
(Continued)

FOREIGN PATENT DOCUMENTS

EP        0411748        2/1991
JP        2002183446     6/2002
(Continued)

OTHER PUBLICATIONS

Transparent fault tolerance for Java Remote Method Invocation; by Narasimhan, Nitya. University of California, Santa Barbara, ProQuest Dissertations Publishing, 2001.p. 8 of a total of 115 (Year: 2001).*
(Continued)

*Primary Examiner* — Eric T Wong
*Assistant Examiner* — Mary M Gregg
(74) *Attorney, Agent, or Firm* — Lempia Summerfield Katz LLC

(57) ABSTRACT

Systems and methods are provided for processing mass quote messages and generating market data. A mass quote message is received and individual orders are parsed and processed. Individual market data messages are stored in a market data message buffer. After all orders are processed, the contents of the market data message buffer is distributed as a single market data message.

10 Claims, 4 Drawing Sheets

Related U.S. Application Data continuation of application No. 10/903,826, filed on Jul. 30, 2004, now abandoned.

(60) Provisional application No. 60/517,491, filed on Nov. 5, 2003.

(51) Int. Cl.
  *G06Q 30/06* (2012.01)
  *G06Q 40/00* (2012.01)
  *G06Q 40/02* (2012.01)
  *H04L 12/58* (2006.01)

(52) U.S. Cl.
  CPC .......... *G06Q 40/00* (2013.01); *G06Q 40/025* (2013.01); *H04L 51/18* (2013.01)

(58) Field of Classification Search
  CPC ............... G06F 17/30457; G06F 9/546; H04L 67/2842; H04L 49/9047; H04L 49/9057; H04L 1/1874; H04L 47/12; H04L 69/22; G06Q 40/04
  USPC ........................................ 705/35–40
  See application file for complete search history.

(56) References Cited

U.S. PATENT DOCUMENTS

| | | | |
|---|---|---|---|
| 5,465,308 A | 11/1995 | Hutcheson et al. | |
| 5,557,780 A | 9/1996 | Edwards et al. | |
| 5,727,165 A | 3/1998 | Ordish et al. | |
| 5,909,570 A | 6/1999 | Webber | |
| 5,953,503 A | 9/1999 | Mitzenmacher et al. | |
| 6,031,577 A | 2/2000 | Ozkan et al. | |
| 6,088,699 A | 7/2000 | Gampper et al. | |
| 6,131,087 A | 10/2000 | Luke et al. | |
| 6,195,024 B1 | 2/2001 | Fallon | |
| 6,278,982 B1* | 8/2001 | Korhammer et al. ...... 705/36 R | |
| 6,309,424 B1 | 10/2001 | Fallon | |
| 6,347,307 B1 | 2/2002 | Sandhu et al. | |
| 6,463,470 B1 | 10/2002 | Mohaban et al. | |
| 6,466,944 B1 | 10/2002 | Stokes | |
| 6,549,949 B1 | 4/2003 | Bowman-Amuah | |
| 6,597,812 B1 | 7/2003 | Fallon et al. | |
| 6,601,104 B1 | 7/2003 | Fallon | |
| 6,604,158 B1 | 8/2003 | Fallon | |
| 6,624,761 B2 | 9/2003 | Fallon | |
| 6,694,054 B1 | 2/2004 | Gardes et al. | |
| 6,748,457 B2 | 6/2004 | Fallon et al. | |
| 6,801,201 B2 | 10/2004 | Escher | |
| 6,950,445 B2 | 9/2005 | Svanbro et al. | |
| 6,963,855 B1 | 11/2005 | Borzenko | |
| 7,082,398 B1 | 7/2006 | Apple et al. | |
| 7,130,913 B2 | 10/2006 | Fallon | |
| 7,143,191 B2 | 11/2006 | Chuah et al. | |
| 7,161,506 B2 | 1/2007 | Fallon | |
| 7,181,608 B2 | 2/2007 | Fallon et al. | |
| 7,228,129 B1* | 6/2007 | Ward et al. ................... 455/423 | |
| 7,321,873 B2 | 1/2008 | Reuter et al. | |
| 7,321,937 B2 | 1/2008 | Fallon | |
| 7,352,300 B2 | 4/2008 | Fallon | |
| 7,358,867 B2 | 4/2008 | Fallon | |
| 7,376,772 B2 | 5/2008 | Fallon | |
| 7,378,992 B2 | 5/2008 | Fallon | |
| 7,386,046 B2 | 6/2008 | Fallon et al. | |
| 7,395,345 B2 | 7/2008 | Fallon | |
| 7,400,274 B2 | 7/2008 | Fallon et al. | |
| 7,415,530 B2 | 8/2008 | Fallon | |
| 7,417,568 B2 | 8/2008 | Fallon et al. | |
| 7,552,077 B1 | 6/2009 | Schluetter et al. | |
| 7,565,319 B1 | 7/2009 | Strauss et al. | |
| 7,685,049 B1 | 3/2010 | Singer | |
| 7,831,491 B2 | 11/2010 | Newell et al. | |
| 7,899,749 B1 | 3/2011 | Studnitzer et al. | |
| 8,036,929 B1 | 10/2011 | Reisman | |
| 8,041,626 B2 | 10/2011 | Kirwin et al. | |
| 8,060,435 B2 | 11/2011 | Kirwin et al. | |
| 8,131,625 B2 | 3/2012 | Langridge | |
| 8,266,040 B2 | 9/2012 | Segal et al. | |
| 2001/0047473 A1 | 11/2001 | Fallon | |
| 2001/0052038 A1 | 12/2001 | Fallon et al. | |
| 2002/0004774 A1 | 1/2002 | Defarlo | |
| 2002/0038276 A1 | 3/2002 | Buhannic et al. | |
| 2002/0038279 A1* | 3/2002 | Samuelson ............ G06Q 10/06 705/37 |
| 2002/0052816 A1* | 5/2002 | Clenaghan ............ G06Q 40/04 705/36 R |
| 2002/0080871 A1 | 6/2002 | Fallon et al. | |
| 2002/0110120 A1* | 8/2002 | Hagglund ............. H04L 12/427 370/389 |
| 2002/0120546 A1* | 8/2002 | Zajac ..................... G06Q 40/04 705/37 |
| 2002/0128938 A1 | 9/2002 | Ronald Schofield et al. | |
| 2002/0128958 A1 | 9/2002 | Slone | |
| 2002/0141449 A1* | 10/2002 | Johnson ................. G06F 9/546 370/473 |
| 2002/0191692 A1 | 12/2002 | Fallon et al. | |
| 2003/0009411 A1 | 1/2003 | Ram et al. | |
| 2003/0033212 A1 | 2/2003 | Sandhu et al. | |
| 2003/0033240 A1* | 2/2003 | Belson ................... G06Q 10/10 705/37 |
| 2003/0093351 A1 | 5/2003 | Sarabanchong | |
| 2003/0167223 A1* | 9/2003 | Pledereder .............. H04L 69/08 705/37 |
| 2003/0225674 A1* | 12/2003 | Hughes et al. .................. 705/37 | |
| 2003/0225857 A1* | 12/2003 | Flynn et al. .................... 709/217 | |
| 2004/0042506 A1 | 3/2004 | Fallon et al. | |
| 2004/0044608 A1 | 3/2004 | Young | |
| 2004/0107123 A1 | 6/2004 | Haffner et al. | |
| 2004/0143538 A1* | 7/2004 | Korhammer et al. .......... 705/37 | |
| 2004/0230660 A1* | 11/2004 | Abjanic ............... H04L 67/1008 709/207 |
| 2004/0236662 A1* | 11/2004 | Korhammer ........... G06Q 40/04 705/37 |
| 2004/0240486 A1* | 12/2004 | Venkatesh et al. ........... 370/537 | |
| 2005/0228735 A1 | 10/2005 | Duquette | |
| 2006/0069635 A1 | 3/2006 | Ram et al. | |
| 2006/0095360 A1 | 5/2006 | Apple et al. | |
| 2006/0184447 A1* | 8/2006 | Nieboer et al. .................. 705/37 | |
| 2007/0011226 A1* | 1/2007 | Hinni ..................... H04L 67/16 709/203 |
| 2007/0043939 A1 | 2/2007 | Fallon et al. | |
| 2007/0050514 A1 | 3/2007 | Fallon | |
| 2007/0050515 A1 | 3/2007 | Fallon | |
| 2007/0067483 A1 | 3/2007 | Fallon | |
| 2007/0083746 A1 | 4/2007 | Fallon et al. | |
| 2007/0174209 A1 | 7/2007 | Fallon et al. | |
| 2008/0232457 A1 | 9/2008 | Fallon et al. | |
| 2009/0076940 A1 | 3/2009 | Patel et al. | |
| 2009/0154545 A1 | 6/2009 | Fallon et al. | |
| 2015/0019397 A1* | 1/2015 | Buck ..................... G06Q 40/04 705/37 |

FOREIGN PATENT DOCUMENTS

| | | |
|---|---|---|
| JP | 2002183450 | 6/2002 |
| JP | 2002183446 | 12/2002 |

OTHER PUBLICATIONS

Larry L. Peterson & Bruce S. Davie, "Computer Networks A Systems Approach", ISBN 1-55860-368-9, 1996, 25 pages.
Nov. 26, 2012—(CA) Office Action—App 2544856.
Sep. 10, 2013—(CA) Office Action—App 2544856.
Sep. 13, 2010—(EP) Office Action—App 04810547.2.
May 13, 2015—(CA) Office Action—App 2885377.
International Search Report from PCT/US04/37238 dated Jun. 13, 2008.
English Translation of Japanese Office Action from JP 2006-538545 dated Jul. 6, 2010, 3 pages.
"Message Encoding/Decoding Using Templated Parameters", Arun K. Nanda, et al., patent application, 40 pages.

(56) References Cited

OTHER PUBLICATIONS

Canadian Office Action from EP Application No. 2,544,856 dated May 23, 2012, 4 pages.

* cited by examiner

TRADE ENGINE PROCESSING OF MASS QUOTE MESSAGES AND RESULTING PRODUCTION OF MARKET DATA

The present application is a continuation application of U.S. patent application Ser. No. 13/168,595, filed Jun. 24, 2011, which is a continuation application of U.S. patent application Ser. No. 10/903,826, filed Jul. 30, 2004 and claims priority to U.S. provisional patent application Ser. No. 60/517,491, filed Nov. 5, 2003, the entire disclosures of all of which are hereby incorporated by reference.

FIELD OF THE INVENTION

Aspects of the present invention relate to the processing of mass quote messages that include a plurality of orders. More specifically, aspects of the present invention provide systems and methods for processing mass quote messages and distributing market data.

BACKGROUND

Current financial instrument trading systems allow traders to combine orders for a group of financial instruments into a single order called a mass quote message. For example, a trader may use a mass quote message when transmitting orders for a group of related option contracts, such as an option series belonging to one option class. With conventional trade engines, each individual order is processed separately and results in the creation of market data. The market data produced for each trade is then distributed to traders and other entities.

As the number of orders and traders increases, the distribution of market data messages can strain computer systems and networks that are used to transmit such messages. The processing of numerous market data messages and associated overhead consumes bandwidth and processing time.

Therefore, there is a need in the art for improved systems and methods for processing mass quote messages and producing and distributing market data messages.

SUMMARY OF THE INVENTION

The present invention overcomes at least some of the problems and limitations of the prior art by providing systems and methods for processing mass quote messages and producing a single market data message. The orders within a mass quote message are processed and result in the production of market data. The market data is stored in one or more market data message buffers. The contents of the market data message buffer(s) is transmitted as a single market data message. In some embodiment of the invention the mass quote message includes orders spread across different order books. The mass quote messages may be formatted in accordance with one or more of the formats described in U.S. provisional patent application Ser. No. 60/517,491.

In various embodiments, aspects of the present invention can be partially or wholly implemented on a computer-readable medium, for example, by storing computer-executable instructions or modules, or by utilizing computer-readable data structures.

Of course, the methods and systems disclosed herein may also include other additional elements, steps, computer-executable instructions, or computer-readable data structures.

The details of these and other embodiments of the present invention are set forth in the accompanying drawings and the description below. Other features and advantages of the invention will be apparent from the description and drawings, and from the claims.

BRIEF DESCRIPTION OF THE DRAWINGS

The present invention may take physical form in certain parts and steps, embodiments of which will be described in detail in the following description and illustrated in the accompanying drawings that form a part hereof, wherein.

DETAILED DESCRIPTION

Exemplary Operating Environment

Figure 1:
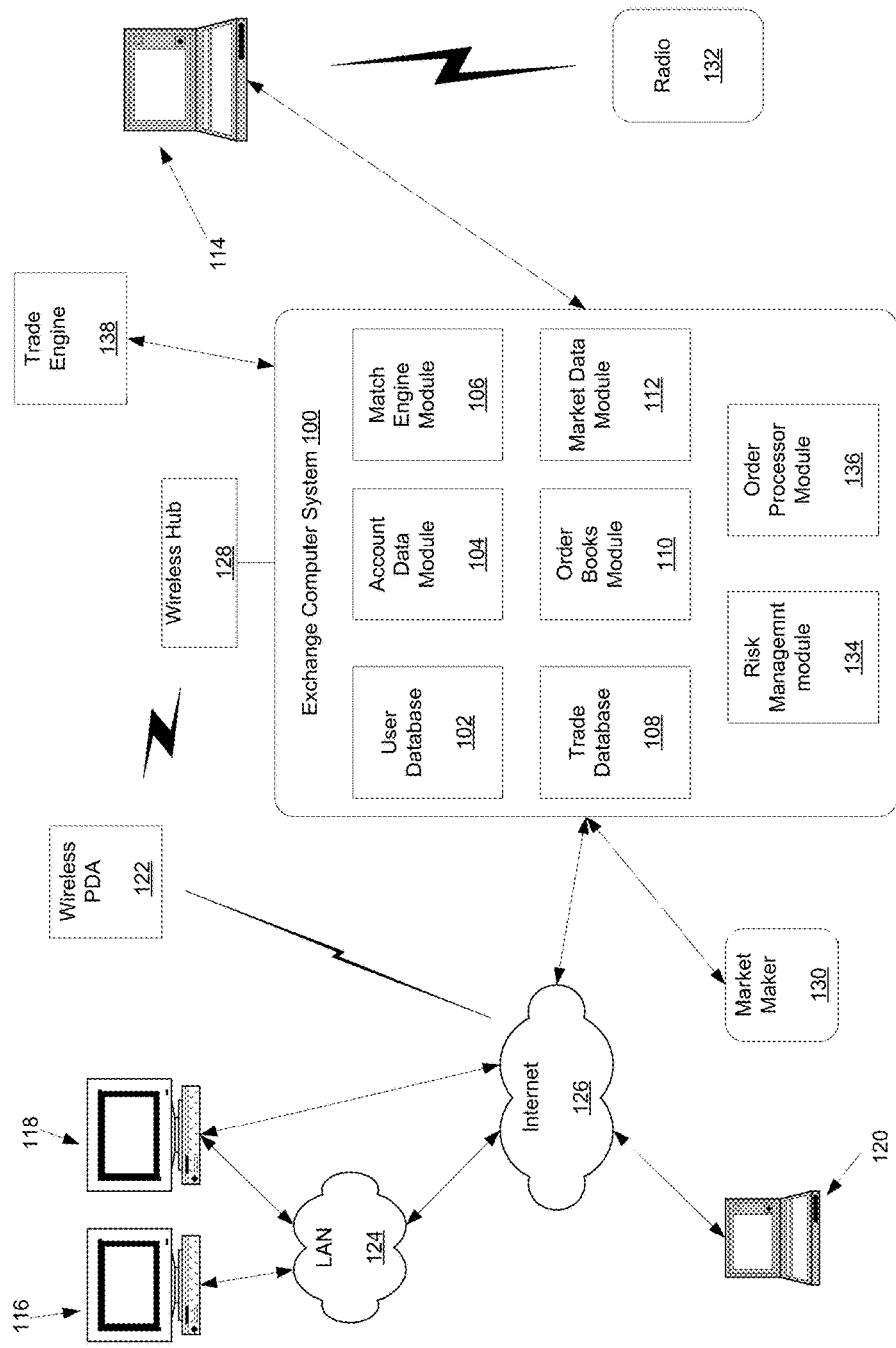
FIG. 1 shows a computer network system that may be used to implement aspects of the present invention.

Aspects of the present invention are preferably implemented with computer devices and computer networks that allow users to exchange trading information. An exemplary trading network environment for implementing trading systems and methods is shown in FIG. 1. An exchange computer system 100 receives orders and transmits market data related to orders and trades to users. Exchange computer system 100 may be implemented with one or more mainframe, desktop or other computers. A user database 102 includes information identifying traders and other users of exchange computer system 100. Data may include user names and passwords. An account data module 104 may process account information that may be used during trades. A match engine module 106 is included to match bid and offer prices. Match engine module 106 may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices. A market data module 112 may be included to collect market data and prepare the data for transmission to users. A risk management module 134 may be included to compute and determine a user's risk utilization in relation to the user's defined risk thresholds. An order processing module 136 may be included to decompose delta based and bulk order types for processing by order book module 110 and match engine module 106.)

The trading network environment shown in FIG. 1 includes computer devices 114, 116, 118, 120 and 122. Each computer device includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer with a keyboard, pointing device, microphone, pen device or other input device.

Computer device 114 is shown directly connected to exchange computer system 100. Exchange computer system 100 and computer device 114 may be connected via a T1 line, a common local area network (LAN) or other mechanism for connecting computer devices. Computer device 114 is shown connected to a radio 132. The user of radio 132 may be a trader or exchange employee. The radio user may transmit orders or other information to a user of computer device 114. The user of computer device 114 may then transmit the trade or other information to exchange computer system 100.

Computer devices 116 and 118 are coupled to a LAN 124. LAN 124 may have one or more of the well-known LAN topologies and may use a variety of different protocols, such as Ethernet. Computers 116 and 118 may communicate with each other and other computers and devices connected to LAN 124. Computers and other devices may be connected to LAN 124 via twisted pair wires, coaxial cable, fiber optics or other media. Alternatively, a wireless personal digital assistant device (PDA) 122 may communicate with LAN 124 or the Internet 126 via radio waves. PDA 122 may also communicate with exchange computer system 100 via a conventional wireless hub 128. As used herein, a PDA includes mobile telephones and other wireless devices that communicate with a network via radio waves.

FIG. 1 also shows LAN 124 connected to the Internet 126. LAN 124 may include a router to connect LAN 124 to the Internet 126. Computer device 120 is shown connected directly to the Internet 126. The connection may be via a modem, DSL line, satellite dish or any other device for connecting a computer device to the Internet.

One or more market makers 130 may maintain a market by providing constant bid and offer prices for a derivative or security to exchange computer system 100. Exchange computer system 100 may also exchange information with other trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on computer-readable medium. For example, computer device 116 may include computer-executable instructions for receiving order information from a user and transmitting that order information to exchange computer system 100. In another example, computer device 118 may include computer-executable instructions for receiving market data from exchange computer system 100 and displaying that information to a user.

Of course, numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may be connected by numerous alternative topologies.

Mass Quote Message Processing and Market Data Dissemination

Figure 2:
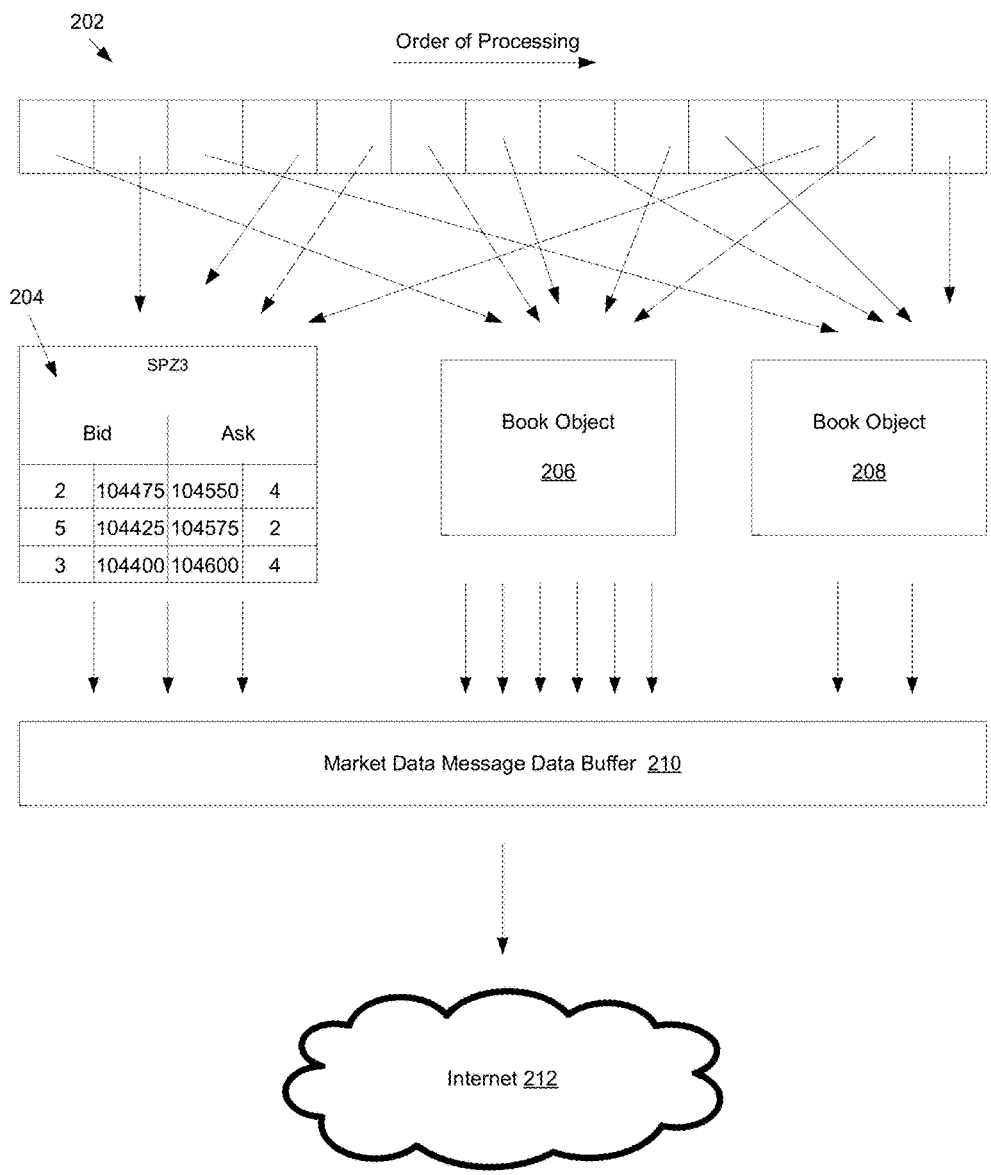
FIG. 2 illustrates a system for processing mass quote messages and a distributing corresponding market data in accordance with an embodiment of the invention.

FIG. 2 illustrates a system for processing mass quote messages and a distributing corresponding market data in accordance with an embodiment of the invention. A mass quote message 202 contains a plurality of orders for financial instruments. The financial instruments may be derivative products. Derivative products may include options on futures contracts, futures contracts that are functions of or related to other futures contracts, or other financial instruments that have their price related to or derived from an underlying product. In one embodiment of the invention, the orders are for options contracts that belong to a common option class. Orders may also be for baskets, quadrants, other combinations of financial instruments, etc. Mass quote message 202 may be received at an exchange. As used herein, an exchange is a place or system that receives and executes orders. The orders in mass quote message 202 are delivered to appropriate order book objects 204, 206 and 208. Each order book object may correspond to a particular financial instrument, such as an option contract and may track or maintain the order book for that financial instrument. The market data produced by each order may be delivered to a market data message buffer 210 where market data for each order in mass quote message 202 is compiled. When all of the market data has been received, the contents in market data message buffer 210 may be distributed to traders and others tracking market data. The transmission may be via the Internet 210 or other mechanisms connecting traders to an exchange.

Figure 3:
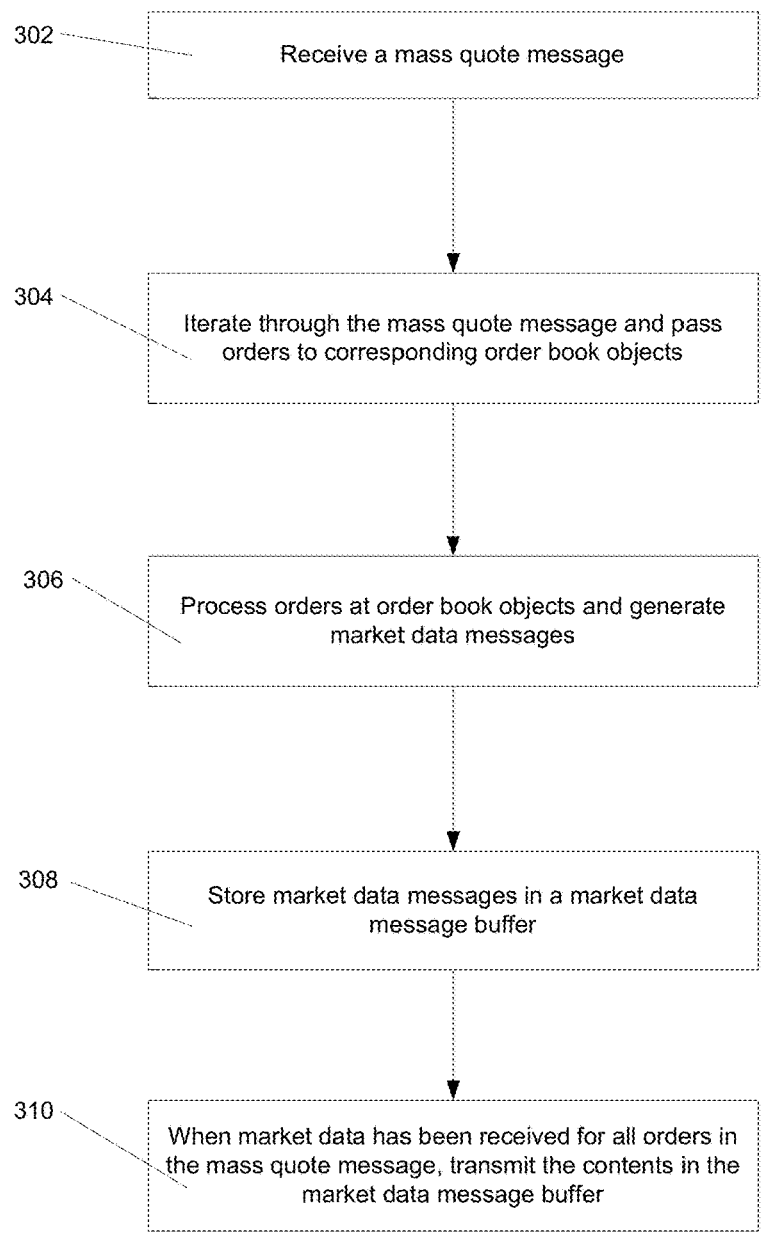
FIG. 3 illustrates a computer implemented method for processing mass quote messages in accordance with an embodiment of the invention.

FIG. 3 illustrates a computer implemented method for processing mass quote messages in accordance with an embodiment of the invention. First, in step 302 a mass quote message is received. The mass quote message includes a plurality of orders for financial instruments and may be received at an exchange, match engine or any other location or device that processes orders for financial instruments. Next, in step 304 a thread iterates through the mass quote message and passes orders to corresponding order book objects. Step 304 may include sequentially reading all of the orders within the message and passing the orders to corresponding order book objects.

Order book objects process orders and generate market data messages in step 306. The processing of orders and generation of market data messages may utilize conventional methods known to those of skill in the art. Each of the market data messages may be stored in a market data message buffer in step 308. The use of a market data message buffer facilitates compiling market data messages so that such messages can be distributed together in a single message. Finally, when market data has been received for all orders in the mass quote message, the contents in the market data message buffer is transmitted in step 310. Step 310 may include transmitting a market data message across one or computer, audio, video or data networks.

There are a number of alternative methods for determining when a market data message buffer has received market data for all of the orders in a mass quote message. An input thread may determine how many orders are within a mass quote message and pass this number to the market data message buffer. Mass quote messages may also contain a fixed number of orders such that the market data message buffer only needs to count individual market messages. In another alternative embodiment, the last order within a mass quote message may include a flag or code that signifies to the market data message buffer or other module that the order is the last order. In yet another embodiment of the invention, order book objects may transmit a code to the market data message buffer when each one is done processing the orders that they have received. When the market data message buffer receives a code from each order book object, the buffer knows that it has received market data for each of the orders in the mass quote message. Each order book object may utilize its own thread for processing orders.

Figure 4:
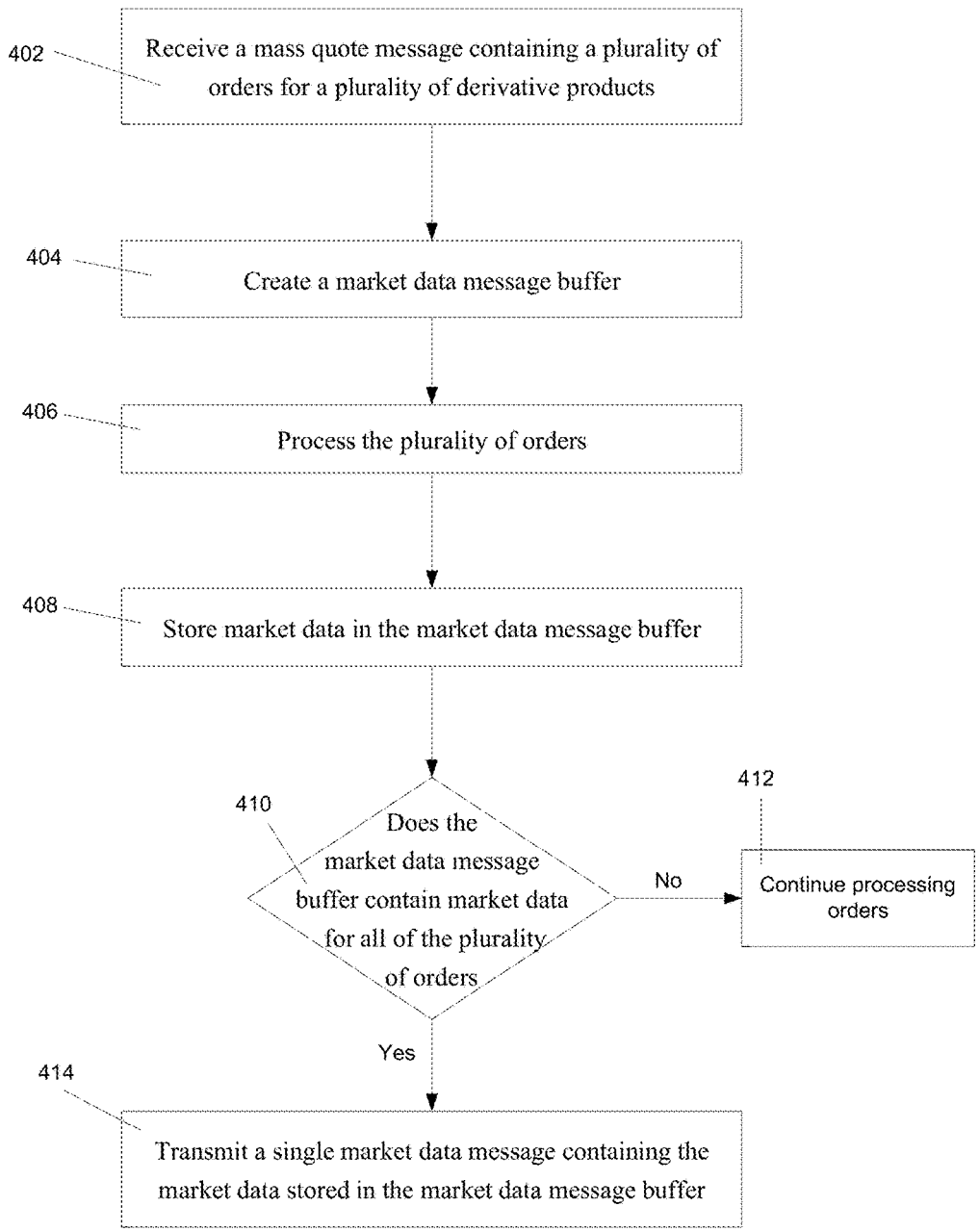
FIG. 4 illustrates a computer implemented method of processing mass quote message that includes creating a market data message buffer, in accordance with an embodiment of the invention.

Aspects of the invention may also use fixed, single and multiple market data message buffers. For example, each order book object may transmit market data messages to a unique market data message buffer. FIG. 4 illustrates a computer implemented method of processing mass quote message that includes creating a market data message buffer, in accordance with an embodiment of the invention. A mass quote message is received in step 402. Next, in step 404, a market data message buffer is created. Step 404 may include determining the required size of the buffer and selecting a buffer from a pool of available buffers or allocating memory for the buffer. In an alternative embodiment, step 404 may include creating a plurality of market data message buffers, such that each order book object that is used to process orders has access to a unique market data message buffer. Of course, two or more order book objects may also share a market data message buffer.

Next, in step 406 the plurality of orders included within the mass quote message are processed by order book objects. Step 406 may include generating market data messages for each of the orders with the mass quote message. Each of the market data messages may be stored in a market data message buffer in step 408.

In step 410 it is determined whether the market data message buffer contains market data for all of the plurality of orders. Step 410 may be performed by using one or more of the processes described above. When all market data has not been received, orders are the processing of orders continues in step 412. When all market data has been received, a single market data message containing the market data stored in the market data buffer is transmitted in step 414.

In embodiments that use multiple market data message buffers, the contents of the buffers may be transmitted as a single market data message after all of the orders have been processed.

The embodiments described above utilize a mass quote message. In alternative embodiments individual orders may be processed and produce market data that is compiled into a single market data message. A variety of criteria may be used to group orders that produce market data that is ultimately compiled into a single market data message. For example, orders received within a predetermined time period or orders for similar financial instruments received within a predetermined time period may be grouped together such that the resulting market data is transmitted within a single market data message.

The embodiments described above also transmit a single market data message after all orders have been processed. In alternative embodiments of the invention a market data message may be transmitted before all of the orders are processed. For example, the message may be transmitted at a predetermined time after receiving market data from the first order. This allows market data to be distributed even when the processing of one or more orders takes an undue length of time. After a first market data message is transmitted, subsequent market data messages may be transmitted upon receipt of additional market data.

The present invention has been described in terms of preferred and exemplary embodiments thereof. Numerous other embodiments, modifications and variations within the scope and spirit of the invention will occur to persons of ordinary skill in the art from a review of this disclosure. For example, aspects of the invention may be used to process and communicate data other than market data.

We claim:

1. A system comprising:
   a computer device that includes a processor and is configured to compile a group of orders for derivative product financial instruments;
   a memory accessible by the computer device and that stores a first template that defines a message structure format that includes a plurality of fields separated by delimiters that minimize message length;
   wherein the processor is configured with computer-executable instructions to perform the steps comprising:
      (a) generating the first template that defines the message structure format that includes a plurality of fields separated by delimiters;
      (b) generating a single message that includes the group of orders and that is formatted in accordance with the first template;
      (c) transmitting the single message that includes the group of orders and that is formatted in accordance with the first template; and
      (d) generating multiple additional templates on a real-time per message basis that define message formats that includes a plurality of fields separated by delimiters and that is different from the first template;
   an exchange computer system that includes a market data message buffer and that is configured with computer-executable instructions to perform the steps comprising:
      (a) receiving, at an order book module of the exchange computer system, the single message that includes the group of orders and that is formatted in accordance with the first template, wherein the group of orders correspond to orders associated with a plurality of order books;
      (b) processing, by the order book module, the single message that includes a group of orders wherein order book module includes a plurality of order book objects, and each of the plurality of order book objects processes in a different thread, a different portion of the group of orders;
      (c) generating market data by each order book object;
      (d) storing, by a market data module, the generated market data in the market data message buffer until a completion code is received from each of the order book objects, wherein each order book object generates the completion code when processing of its associated portion of the group of orders has finished; and
      (e) transmitting, by the market data module upon receipt of the completion code from each of the plurality of order book objects, the contents of the market data message buffer as a single market data message.

2. The system of claim 1, wherein the single message is transmitted to order book objects.

3. The system of claim 2, wherein each of the order book objects corresponds to a financial instrument.

4. The system of claim 1, wherein the financial instruments comprise option contracts.

5. The system of claim 1, wherein the financial instruments comprise futures contracts.

6. The system of claim 1, wherein the computer device is further configured with computer-executable instructions to receive the first template from the exchange computer system.

7. The system of claim 1, wherein the computer device is further configured with computer-executable instructions to transmit the first template to the exchange computer system.

8. The system of claim 7, wherein the computer device is further configured with computer-executable instructions to transmit the second template to the exchange computer system.

9. The system of claim 8, wherein the computer device is further configured with computer-executable instructions to generate a single message that includes the group of orders and that is formatted in accordance with the second template.

10. The system of claim 9, wherein the computer device is further configured with computer-executable instructions to transmit to the exchange computer system the single message that includes the group of orders and that is formatted in accordance with the second template.

* * * * *